United States Patent
Leobandung et al.

(10) Patent No.: US 11,556,763 B2
(45) Date of Patent: Jan. 17, 2023

(54) MULTI-KERNEL CONFIGURATION FOR CONVOLUTIONAL NEURAL NETWORKS

(71) Applicant: International Business Machines Corporation, Armonk, NY (US)

(72) Inventors: Effendi Leobandung, Stormville, NY (US); Malte Rasch, Chappaqua, NY (US); Xiao Sun, Pleasantville, NY (US); Yulong Li, Westchester, NY (US); Zhibin Ren, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 1004 days.

(21) Appl. No.: 16/279,416

(22) Filed: Feb. 19, 2019

(65) Prior Publication Data

US 2020/0265298 A1 Aug. 20, 2020

(51) Int. Cl.
*G06K 9/00* (2022.01)
*G06N 3/063* (2006.01)
(Continued)

(52) U.S. Cl.
CPC ......... *G06N 3/063* (2013.01); *G06K 9/6267* (2013.01); *G06N 3/0445* (2013.01); *G06N 3/0635* (2013.01); *G06V 10/82* (2022.01)

(58) Field of Classification Search
CPC .... G06N 3/063; G06N 3/0445; G06N 3/0635; G06N 3/084; G06N 3/0454; G06K 9/6267; G06K 9/6271; G06V 10/82
See application file for complete search history.

(56) References Cited

U.S. PATENT DOCUMENTS 5,220,559 A 6/1993 Tsuzuki et al.
6,216,119 B1 4/2001 Jannarone
(Continued)

FOREIGN PATENT DOCUMENTS

WO 2005/088535 A2 9/2005

OTHER PUBLICATIONS

Sze, V., et al., "Efficient Processing of Deep Neural Networks: A Tutorial and Survey", arXiv:1703.09039v2, Aug. 13, 2017, 32 pages.
(Continued)

*Primary Examiner* — Ping Y Hsieh
(74) *Attorney, Agent, or Firm* — Scully, Scott, Murphy & Presser, P.C.; L. Jeffrey Kelly

(57) ABSTRACT

Methods and systems of implementing a convolutional neural network are described. In an example, a structure may receive input signals and distribute the input signals to a plurality of unit cells. The structure may include a plurality of multi-kernel modules that may include a respective set of unit cells. A unit cell may correspond to an element of a kernel being implemented in the convolutional neural network and may include a storage component configured to store a weight of a corresponding element of the kernel. A first pass gate of the unit cell may be activated to pass a stored weight of the unit cell to a plurality of operation circuits in the corresponding unit cell, such that the stored weight may be applied to the input signals. The structure may generate a set of outputs based on the application of the stored weights to the input signals.

20 Claims, 9 Drawing Sheets

(51) Int. Cl.
*G06K 9/62* (2022.01)
*G06N 3/04* (2006.01)
*G06V 10/82* (2022.01)

(56) References Cited

U.S. PATENT DOCUMENTS

| | | |
|---|---|---|
| 7,054,850 B2 | 5/2006 | Matsugu |
| 2017/0169327 A1 | 6/2017 | Nestler et al. |
| 2017/0200078 A1 | 7/2017 | Bichler |
| 2019/0080231 A1* | 3/2019 | Nestler ............. G06N 3/0481 |
| 2019/0213471 A1* | 7/2019 | Jeon .................. G06N 7/023 |
| 2019/0325291 A1* | 10/2019 | Gokmen ............. G06N 3/0454 |
| 2020/0118638 A1* | 4/2020 | Leobandung ....... G06N 3/0454 |

OTHER PUBLICATIONS

Sackinger, E., et al., "Application of the ANNA neural network chip to high-speed character recognition", IEEE Transactions on Neural Networks (May 1992), Mar. 18, 1991, 22 pages.

Roska, T., et al., "The CNN Universal Machine: An Analogic Array Computer", IEEE Transactions on Circuits and Systems II: Analog and Digital Signal Processing, Mar. 1993, pp. 163-173, vol. 40, No. 3.

* cited by examiner

MULTI-KERNEL CONFIGURATION FOR CONVOLUTIONAL NEURAL NETWORKS

BACKGROUND

The present disclosure relates in general to neural networks and neuromorphic hardware and system implementing such neural networks.

An artificial neural network (ANN) is a computational model inspired by biological neural networks in human or animal brains. An ANN progressively and autonomously learns tasks by means of examples. Applications of ANN may include, but are not limited to, speech recognition, text processing and image classification. An ANN comprises a set of connected nodes (or neurons) and edges (connections between the nodes). Signals can be transmitted along the edges between the nodes. A node that receives a signal may process the received signal and convey the processed signal (an output) to connected nodes. Weights may be associated with the connections and nodes, and the weights may be adjusted as the learning proceeds.

SUMMARY

In some examples, a structure that may implement a convolutional neural network is generally described. The structure may include a plurality of multi-kernel modules. A multi-kernel module may include a plurality of unit cells. A unit cell may correspond to an element of a kernel being implemented in the convolutional neural network. The unit cell may include a control circuit that may include a storage component configured to store a weight of a corresponding element of the kernel. Each cell unit may further include a plurality of operation circuits connected to the control circuit, where an operation circuit among the plurality of operation circuits may be operable to receive an input signal. The control circuit may be operable to control an application of the weight to the input signals received by the plurality of operation circuits to implement the convolutional neural network.

In some examples, a system that may implement a convolutional neural network is generally described. The system may include a processor and a structure configured to be in communication with each other. The structure may include a plurality of multi-kernel modules. A multi-kernel module may include a plurality of unit cells. A unit cell may correspond to an element of a kernel being implemented in a convolutional neural network. The unit cell may include a control circuit that may include a storage component configured to store a weight of a corresponding element of the kernel. The unit cell may further include a plurality of operation circuits connected to the control circuit. An operation circuit among the plurality of operation circuits may be operable to receive an input signal associated with a data unit among the array of data units. The control circuit may be operable to control an application of the weight to the input signals received by the plurality of operation circuits to implement the convolutional neural network. The processor may be configured to receive an input comprising an array of data units. The processor may be further configured to receive a request to classify the input by implementing the convolutional neural network. The processor may be further configured to send the input to the structure to perform the classification of the input.

In some examples, a method of implementing a convolutional neural network is generally described. The method may include receiving an input comprising an array of data units. The method may further include receiving a request to classify the input by implementing the convolutional neural network. The method may further include sending input signals associated with the array of data units of the input to a plurality of unit cells of a structure. The structure may include a plurality of multi-kernel modules. A multi-kernel module may include a respective set of unit cells. A unit cell may correspond to an element of a kernel being implemented in the convolutional neural network. The unit cell may include a storage component configured to store a weight of a corresponding element of the kernel. The method may further include activating a first pass gate of the unit cell in the structure to pass a stored weight of the unit cell to a plurality of operation circuits in the corresponding unit cell. The passing of the stored weight to the plurality of operation circuits may cause the unit cell to apply the stored weight to input signals received at the plurality of operation circuits. The method may further include generating a set of outputs based on the application of the stored weights to the input signals. The method may further include classifying the input based on the set of outputs.

Further features as well as the structure and operation of various embodiments are described in detail below with reference to the accompanying drawings. In the drawings, like reference numbers indicate identical or functionally similar elements.

DETAILED DESCRIPTION

Figure 1:
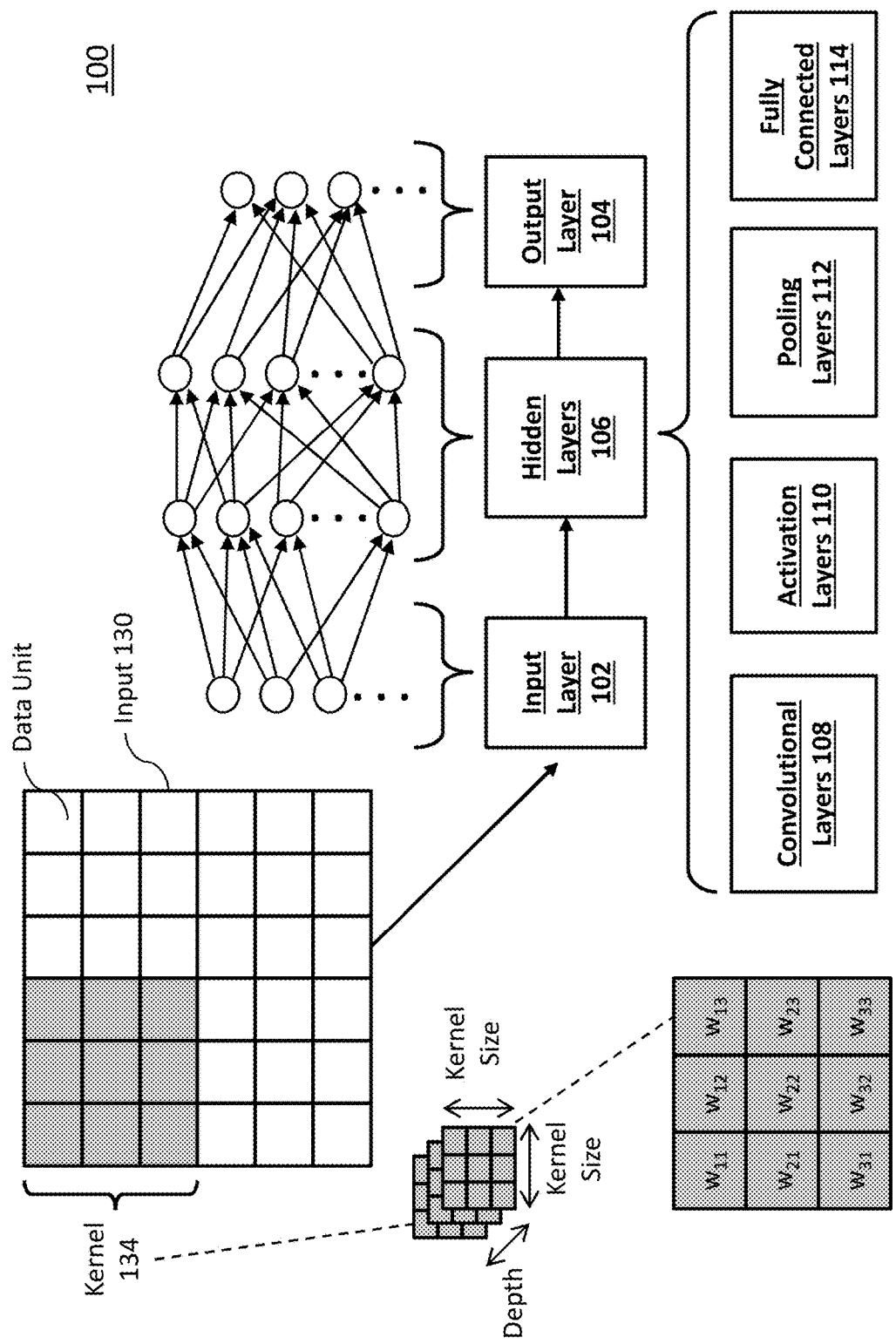
FIG. 1 is a diagram showing architecture of an example convolutional neural network in one embodiment.

A deep neural network (DNN) is an ANN with multiple layers between the input and output layers. A DNN may determine the correct mathematical manipulations (linear relationship or a non-linear relationship) to transform inputs into the outputs. The DNN moves through the layers calculating the probability of each output, and each mathematical manipulation is considered as a layer. In an example where DNN is applied on image recognition, the goal of a DNN is to learn features of an image and classify new input images by comparing them with the learned features, without requiring human input. DNNs may also be used to model relatively complex non-linear relationships, and are typically feedforward networks.

In a feedforward neural network (such as a multilayer perceptron), multiple nodes may be arranged in layers. Nodes from adjacent layers have connections between them, which are associated with weights. A feedforward neural network may include three types of nodes: input nodes, hidden nodes, and output nodes, arranged in respective layers. Input nodes are nodes of the input layer, and are tasked with providing information from the outside to the network. Input nodes, in some examples, pass on information to the hidden nodes of the hidden layers and do not perform any computation. Hidden nodes are arranged in one or more hidden layers, and are hidden from the outside of the network. Hidden nodes are configured to perform computations and transfer information from the input layer to the output nodes. Output nodes of the output layer may compute and transfer information from the network to the outside. A feedforward network has a single input layer and a single output layer, and may include one or more hidden layers, or in some examples, no hidden layer at all. As such, information propagates in only one direction (forward direction) in a feedforward network, where the forward direction is from the input nodes to the output nodes, through the hidden nodes. Feedforward networks may be free of cycles or loops, which is different from recurrent neural networks (RNNs) that involve cyclic connections between nodes. A recurrent neural networks (RNNs) is a network where data can flow in any direction. RNNs may be used for applications such as language modeling.

A convolutional neural network (CNN) is a class of deep neural networks. CNNs use a variation of multilayer perceptrons, for example, designed to require minimal preprocessing. CNNs are also known as shift invariant or space invariant artificial neural networks (SIANN), based on their shared-weights architecture and translation invariance characteristics. In an example, CNNs may learn filters in image processing applications, where the learning is independent from prior knowledge and human input. Applications of CNNs may include, but not limited to, image and video recognition, computer vision, recommender systems, image classification, medical image analysis, acoustic modeling for automatic speech recognition (ASR), and natural language processing.

FIG. 1 is a diagram showing architecture of an example convolutional neural network (CNN) in one embodiment. The following descriptions of example embodiments of a CNN are presented by way of example. It is noted that embodiment(s) of a CNN described in the present disclosure is not limited to the examples described herein. A convolutional neural network (CNN) 100 may include an input layer 102 and an output layer 104, and/or multiple hidden layers 106. The CNN 100 may be a feedforward network, such that information propagates in a forward direction from the input layer 102 to the output layer 104, through the hidden layers 106. The input layer 102 may include input nodes that are configured to provide information from outside of the CNN 100 to the hidden layers. In one aspect, the input nodes need not be configured to perform a computation. The output layer 104 may include output nodes that may compute and transfer information from the hidden layers 106 to outside of the CNN, such as to a computer device. The input layer 102 and/or hidden layers 106 may include one or more layers and the layers among the hidden layers 106 may include respective set of nodes configured to perform different tasks and/or computations. In the example embodiment shown in FIG. 1, the hidden layers 106 may include one or more convolutional layers 108, activation layers 110, pooling layers 112, fully connected layers 114, and/or other additional types of layers. A node among a hidden layer may be connected to a node from a previous layer by an edge, and may be connected to a node in a next layer by another edge.

The convolutional layers 108 may include convolutional nodes configured to apply a convolution operation to inputs to the convolution nodes, and passing the results of the convolutions to a next layer. In one embodiment, a convolutional node may process data only for its receptive field. A receptive field is an input area of a node. For example, a node may receive input from a number of nodes in the previous layer. In another example, in a fully connected layer, a node receives input from every element of the previous layer (e.g., the receptive field is the entire previous layer). In another example, in a convolutional layer, the nodes receive input from only a restricted subarea of the previous layer (e.g., the receptive area is smaller than the entire previous layer).

The activation layers 110 may include activation nodes configured to perform non-linear functions, and the activation layers 110 may be positioned after a convolutional layer that includes nodes configured to compute linear operations. The addition of activation layers after such linear convolutional layers introduces nonlinearity to a system. For example, the activation layers 110 may include rectified linear units (ReLU) layers that include nodes configured to perform a rectifier function $f(x)=\max(0, x)$. The rectifier function changes negative inputs to 0 or positive outputs, and increases the nonlinear properties of the CNN without affecting the receptive fields of the convolution layers. Other types of function different from the ReLU function may be implemented in the activation layers 110.

The pooling layers 112 may include pooling nodes configured to combine the outputs of clusters or groups of nodes at a previous layer into a single node. For example, max pooling nodes selects the maximum value from outputs of a group of nodes at the previous layer. In another example, average pooling nodes computes the average value of the outputs of a group of nodes at the previous layer. In some examples, the CNN 100 may include more than one combinations of convolution layer, activation layer, and pooling layer.

Nodes in the fully connected layer 114 are connected to all nodes in the previous layer (in this case, the last pooling layer). The fully connected layer 114 includes nodes configured to receive an input from a previous layer (e.g., convolutional layer, activation layer, or pooling layer) and outputs an N-dimensional vector where N is the number of classes in the classification being learned by the CNN. For example, if the CNN 100 is being trained to classify an image into two categories, the fully connected layer 114 can output a 2-dimensional vector. The fully connected layer 114 is thus configured to identify features that correlate to a particular class. In some examples, activations of the fully connected layers 114 may be computed as an affine transformation, with matrix multiplication followed by a bias offset (e.g., vector addition of a learned or fixed bias term).

The CNN 100 may receive, at the input layer 102, an input 130 that includes an array of data units (e.g., an image including an array of pixels). A node in the input layer 102 may represent a value of a data unit (e.g., a pixel value) among the input 130. For example, if input 130 is an image including 100×100=10,000 pixels, input layer 102 can be assigned with 10,000 input nodes representing pixel values of the 10,000 pixels. In an example, a convolutional layer may be connected to the input layer 102, and an edge connecting an input node to a convolutional node may be associated with a weight. The convolutional layer may perform convolution by applying one or more kernels or filters of a particular size on the input 130. In the example shown in FIG. 1, a kernel 134 of size 3×3 (3 rows of pixels, 3 columns of pixels) may be used by the convolutional layer. A kernel 134 may include a respective set of weights. In FIG. 1, the shaded portion of the input 130 corresponds to nine pixels, in a 3×3 arrangement, and these nine pixels may be represented by nine input nodes in the input layer 102. In an example, an example convolutional layer that is subsequent to the input layer of the CNN 100 may include a plurality of nodes that may store results from an application of the kernel 134 on the input 130. The plurality of nodes storing the results may represent data units of a feature map generated as a result of the implementation of the example convolutional layer. Each of the nodes (referred to as a convolutional node for explanation sake only) in the example convolutional layer may be connected by nine edges from the nine input nodes (the 3×3 kernels are being applied to an area of 3×3 pixels in the input). Thus, the receptive fields of each of the convolutional nodes in the first convolutional layer are the same (the nine input nodes), but the three sets of nine edges leading into each convolutional node may be associated with respective set of weights. For example, a horizontal edge detection filter and a vertical edge detection filter may include different weights.

Hardware implementations of CNN may include using analog crossbar arrays with analog memory (e.g., capacitors) to accelerate matrix multiplications during learning. A crossbar array configuration includes a set of conductive row wires, in a first orientation, and a set of conductive column wires, in a second orientation, that intersect the set of conductive row wires. The intersections between the row and column wires may be separated by devices, such as analog memory devices (e.g., capacitor). To implement a CNN, a row wire may implement an input to a node, a column wire may output an output or result from a node, and the capacitors may function as the weighted edges connecting nodes from different layers. Input signals entering the row wires may be multiplied with the data (e.g., weight) being stored in the capacitors, and the result can be outputted through the column wires.

In examples where CNNs are being used to process images, due to the size of the input dataset (e.g., an image), the time required to forward pass all the data through the nodes of the CNN is approximately $N^2 \times$integration time, where N is the linear number of pixels assuming stride of one (e.g., moving one pixel at a time). As the value of N increases, the learning time may become undesirable for analog systems. Other hardware implementations, such as using multiple set of kernels to accelerate the forward pass, reduces the time to $N^2/(P \times$integration time), where P represents a number of multi-kernel modules, and a multi-kernel module may include a plurality of kernels or filters. However, as P increases, wiring between the components becomes more difficult. To be described in more detail below, a CNN may be implemented with a structure that includes a combination of separate multi-set kernel, averaging multi-set kernel, and identical multi-set kernel implementations.

Figure 2:
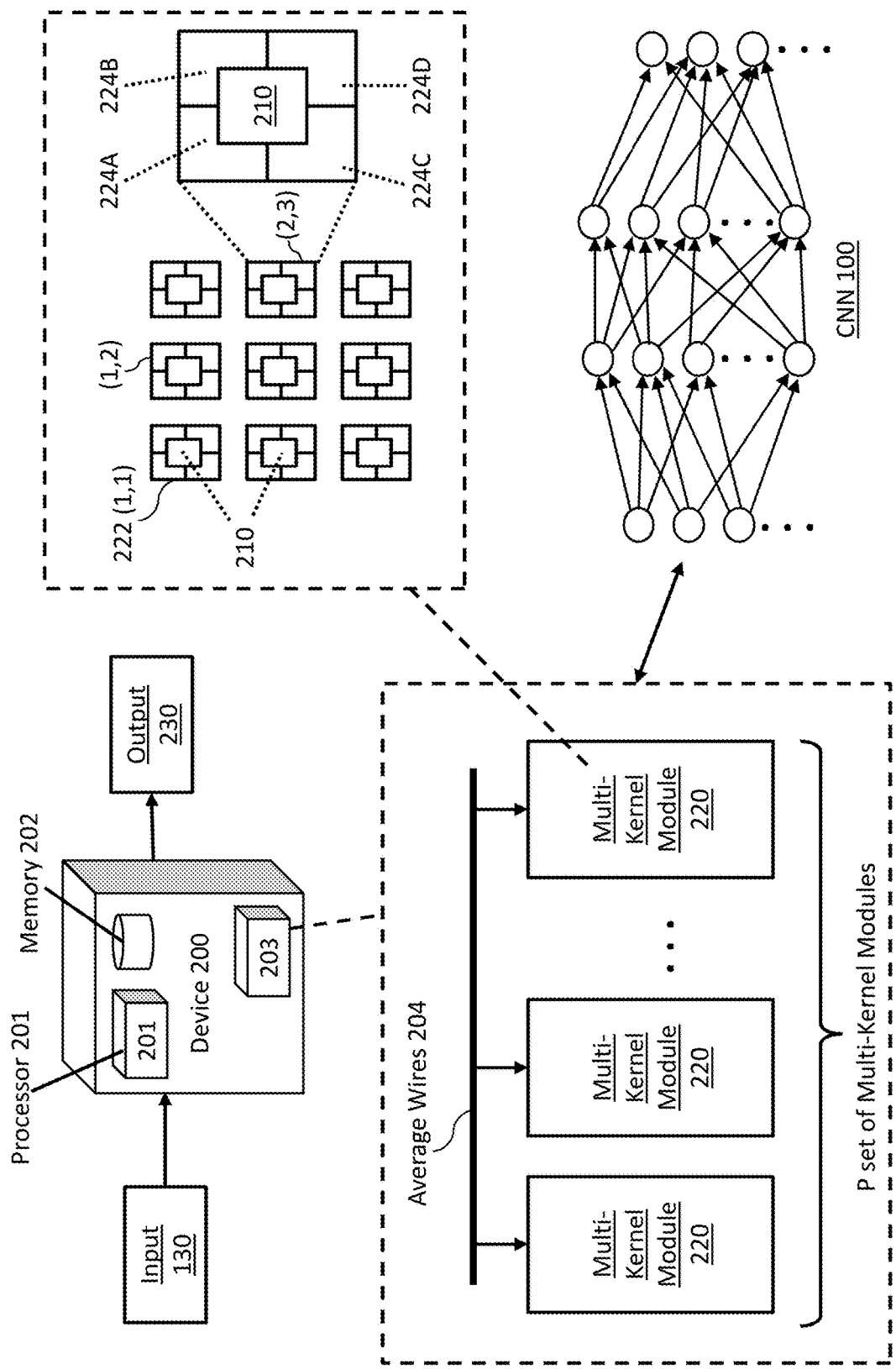
FIG. 2 is a diagram showing an example of a multi-kernel configuration for convolutional neural networks in one embodiment.

FIG. 2 is a diagram showing an example of a mixed multiple kernel configuration for convolutional neural networks in one embodiment. FIG. 2 may include components that are labeled identically to components of FIG. 1, which are not described again for the purposes of clarity. The description of FIG. 2 may reference at least some of the components of FIG. 1.

In an example shown in FIG. 2, a system to implement the mixed multiple kernel configuration for convolutional neural networks in accordance with the present disclosure may include a device 200 configured to implement the CNN 100. The device 200 may be a computer device configured to receive the input 130, where the input 130 may include an array of data nits (e.g., pixels of an image). The device 200 may further receive a request to classify the input 130. The device 200 may implement the CNN 100 to generate an output 230, where the output 230 may be, for example, a classification of the input 130. The device 200 may include a processor 201, a memory device 202 ("memory 202") and a structure 203 configured to be in communication with each other. In one example embodiment, the structure 203 may be a part of the memory 202. In another example embodiment, the structure 203 may be a memory accelerator of a hardware (e.g., graphics processing unit) or another processor configured to implement the CNN 100. In an example, the processor 201 may receive the input 130 and transmit the input 130 into the structure 203. The structure 203 may include a plurality of wires (also referred to as average wires) 204 and a plurality of multi-kernel modules 220 (e.g., P sets of multi-kernel modules 220). The multi-kernel modules 220 may be connected to each other via the plurality of average wires 204 (described below). The processor 201 may be configured to generate control signals and send the control signals to the multi-kernel modules 220. A number of multi-kernel modules 220 (e.g., the value of P) may be configured based on a desired implementation of the CNN 100, attributes of the CNN 100 (e.g., size, number of layers), attributes of the input 130 and output 230 (e.g., size), and/or other factors. The structure 203 includes circuitry that can be implemented as, for example, a convolutional layer of a CNN, and/or other neural network applications that may utilize kernels to filter and transform data. In an example where a CNN includes multiple convolutional layers, a first set of multi-kernel modules P1, with M1 copies of the kernel, may implement a first convolutional layer of the CNN, and a second set of multi-kernel modules P2, with M2 copies of the kernel, may implement a second convolutional layer of the CNN.

A multi-kernel module 220 may include M copies of operation circuits corresponding to elements of a kernel. For example, M copies may correspond to an element of a kernel. In some examples, the value of M may be a number of kernels 134 being implemented by a CNN. For example, if a CNN implements four kernels 134, then the processor 201 may set value of M to 4. The multi-kernel module 220 includes a plurality of unit cells 222. In one embodiment, the plurality of unit cells 222 may include identical circuitry. For instance, a unit cell 222 may include circuitry that is same as another unit cell's circuitry. In the example shown in FIG. 2, a unit cell 222 may include four copies (M=4) of operation circuits corresponding to an element of a 3×3 kernel, denoted as K. All elements of K may have M copies of operation circuits. For example, four operation circuits 224A, 224B, 224C, 224D (copies A, B, C, D) of the element $K_{23}$, or (2, 3), may form a unit cell (labeled as (2, 3)). In one embodiment, the four operation circuits 224A, 224B, 224C, 224D may include same or identical circuitry and may be associated with elements $K_{23A}$, $K_{23B}$, $K_{23C}$, $K_{23D}$, respectively. A cell unit 222 may further include a control circuit 210 connected to the average wires 204, and the control circuit 210 may be connected to the plurality of operation circuits within the unit cell 222. The unit cells 222 may be connected with each other via the average wires 204, which will be described in more detail below. In one embodiment, the plurality of unit cells in a multi-kernel module 220 may include substantially same or identical circuitry but may store respective weights, e.g., weights can be different. For example, a unit cell corresponding to element (1, 1) may store a first weight and a unit cell corresponding to element (1, 2) may store a second weight. In one embodiment, the configuration of the structure 203 provides a total M*P set of kernels (e.g., identical kernels), and reduces forward pass, backward pass, or update pass time during implementation of the CNN 100 by a factor of 1/(M*P).

Figure 3:
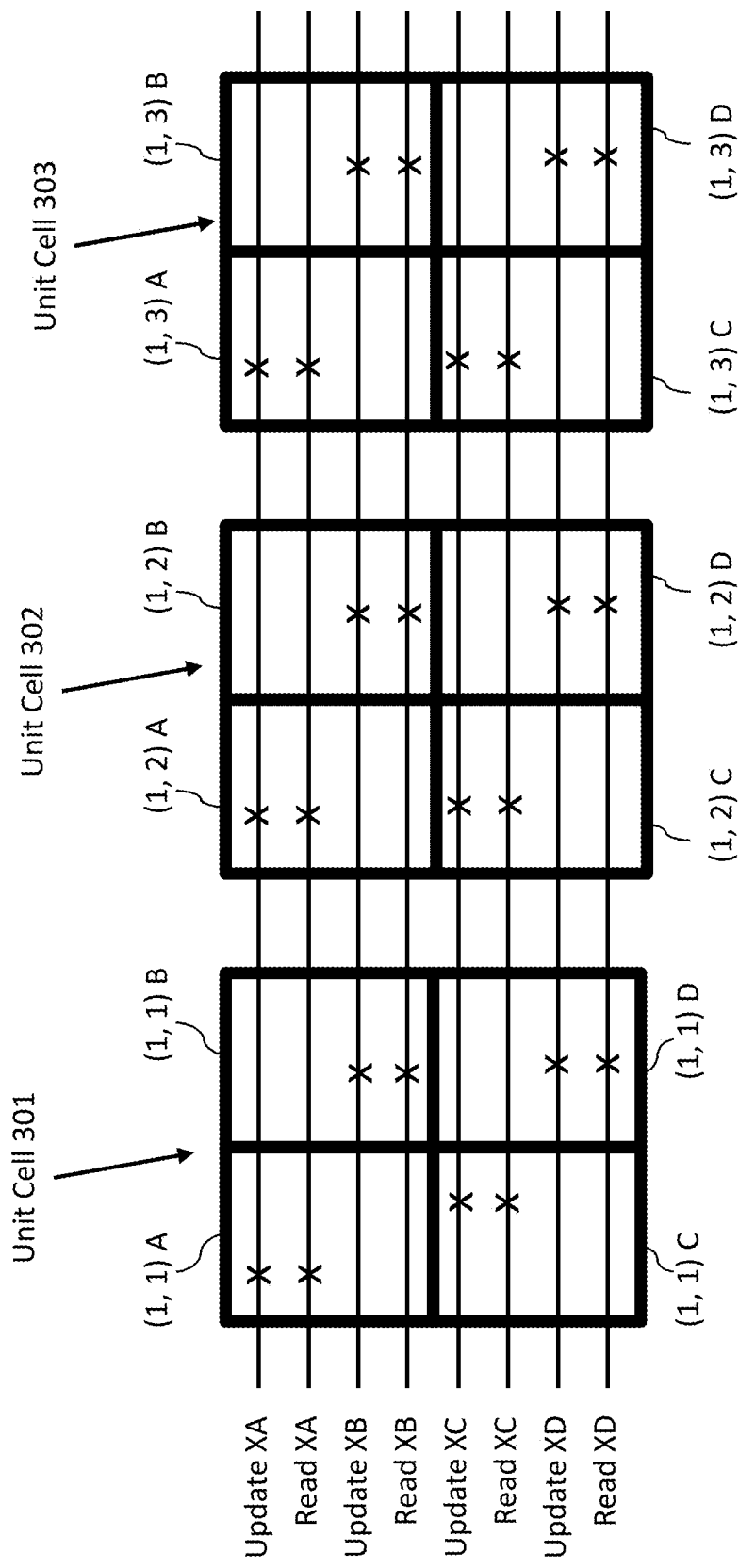
FIG. 3 is a diagram showing additional details of a multi-kernel configuration for convolutional neural networks in one embodiment.

FIG. 3 is a diagram showing additional details of a mixed multiple kernel configuration for convolutional neural networks in one embodiment. Such configuration may include a row-column arrangement of circuit components. FIG. 3 may include components that are labeled identically to components of FIGS. 1-2, which will not be described again for the purposes of clarity. The description of FIG. 3 may reference at least some of the components of FIGS. 1-2.

An example shown in FIG. 3 illustrates a row connection configuration of a plurality of unit cells within a multi-kernel module. A unit cell 301 may include four copies of an operation circuit corresponding to an element (1, 1) of a kernel. Similarly, a unit cell 302 may include four copies of an operation circuit corresponding to an element (1, 2) of the kernel, and a unit cell 303 may include four copies of an operation circuit corresponding to an element (1, 3) of the kernel. The operation circuits labeled as copy A (e.g., (1, 1)A, (1, 2)A, (1, 3)A) may be connected by row wires (or wires in a first orientation) labeled as "Update XA", "Read XA". The operation circuits labeled as copy B (e.g., (1, 1)B, (1, 2)B, (1, 3)B) may be connected by row wires labeled as "Update XB", "Read XB". The operation circuits labeled as copy C (e.g., (1, 1)C, (1, 2)C, (1, 3)C) may be connected by row wires labeled as "Update XC", "Read XC". The operation circuits labeled as copy D (e.g., (1, 1)D, (1, 2)D, (1, 3)D) may be connected by row wires labeled as "Update XD", "Read XD".

An update row wire is operable to perform an update, such as updating a weight, associated with the corresponding element and a read row wire is operable to read data from the corresponding element. For example, the "Update XA" wire is operable to receive an update signal (e.g., from the processor 201 of the device 200 in FIG. 2) and relay the update signal to operation circuits labeled as copies A among the unit cells to activate an update operation of the connected elements. The "Read XA" wire is operable to receive data outputted operation circuits labeled as copies A, and the received data is transmitted to another device, component, or another layer of a CNN, via the "Read XA" wire. For example, the row wires may be connected to one or more nodes of a layer previous to a convolutional layer in the CNN being implemented by the structure 203.

Figure 4:
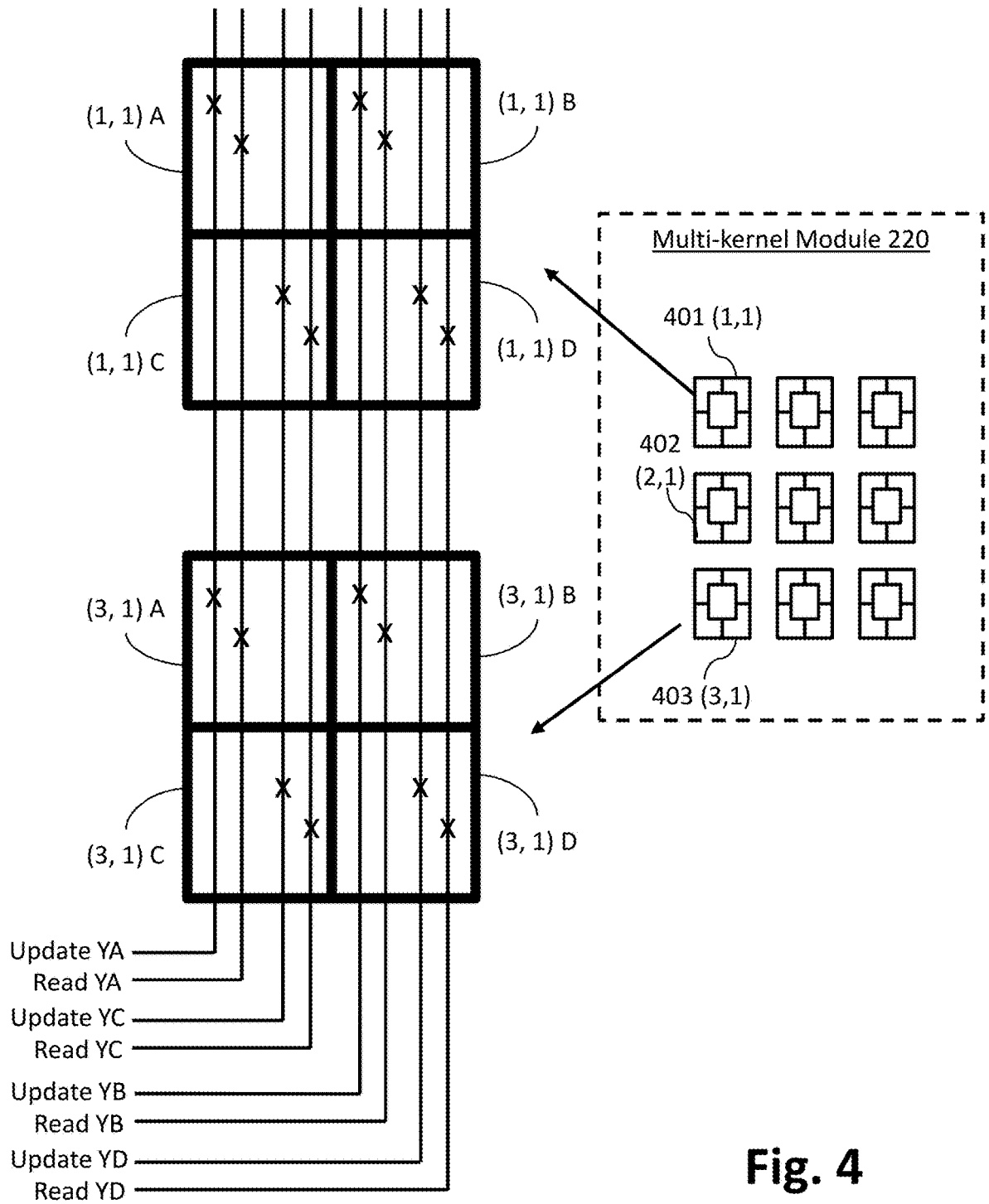
FIG. 4 is a diagram showing additional details of a multi-kernel configuration for convolutional neural networks in one embodiment.

FIG. 4 is a diagram showing additional details of a mixed multiple kernel configuration for convolutional neural networks in one embodiment. FIG. 4 may include components that are labeled identically to components of FIGS. 1-3, which will not be described again for the purposes of clarity. The description of FIG. 4 may reference at least some of the components of FIGS. 1-3.

An example shown in FIG. 4 illustrates a column connection configuration of a plurality of unit cells within a multi-kernel module 220. The multi-kernel module 220 may include a plurality of unit cells, such as 401, 402, 403. The unit cell 401 may include four copies of an operation circuit corresponding to an element (1, 1) of a kernel. Similarly, the unit cell 403 may include four copies of an operation circuit corresponding to an element (3, 1) of the kernel. The operation circuits labeled as copy A (e.g., (1, 1)A, (3, 1)A) may be connected by column wires (or wires in a second orientation) labeled as "Update YA", "Read YA". The operation circuits labeled as copy B (e.g., (1, 1)B, (3, 1)B) may be connected by column wires labeled as "Update YB", "Read YB". The operation circuits labeled as copy C (e.g., (1, 1)C, (3, 1)C) may be connected by column wires labeled as "Update YC", "Read YC". The operation circuits labeled as copy D (e.g., (1, 1)D, (3, 1)D) may be connected by column wires labeled as "Update YD", "Read YD". The column wires shown in FIG. 4 also connect to a unit cell 402 corresponding to an element (2, 1), which is not shown in the example for simplicity.

An update column wire is operable to perform an update associated with the corresponding element and a read column wire is operable to read data from the corresponding element. For example, the "Update YA" wire is operable to receive an update signal (e.g., from the processor 201 of the device 200 in FIG. 2) and relay the update signal to operation circuits labeled as copies A among the unit cells to activate an update operation of the connected elements. The "Read YA" wire is operable to receive data outputted operation circuits labeled as copies A, and the received data is transmitted to another device, component, or another layer of a CNN, via the "Read YA" wire. For example, the column wires may be connected to one or more nodes of a layer subsequent to a convolutional layer in the CNN being implemented by the structure 203.

Figure 5:
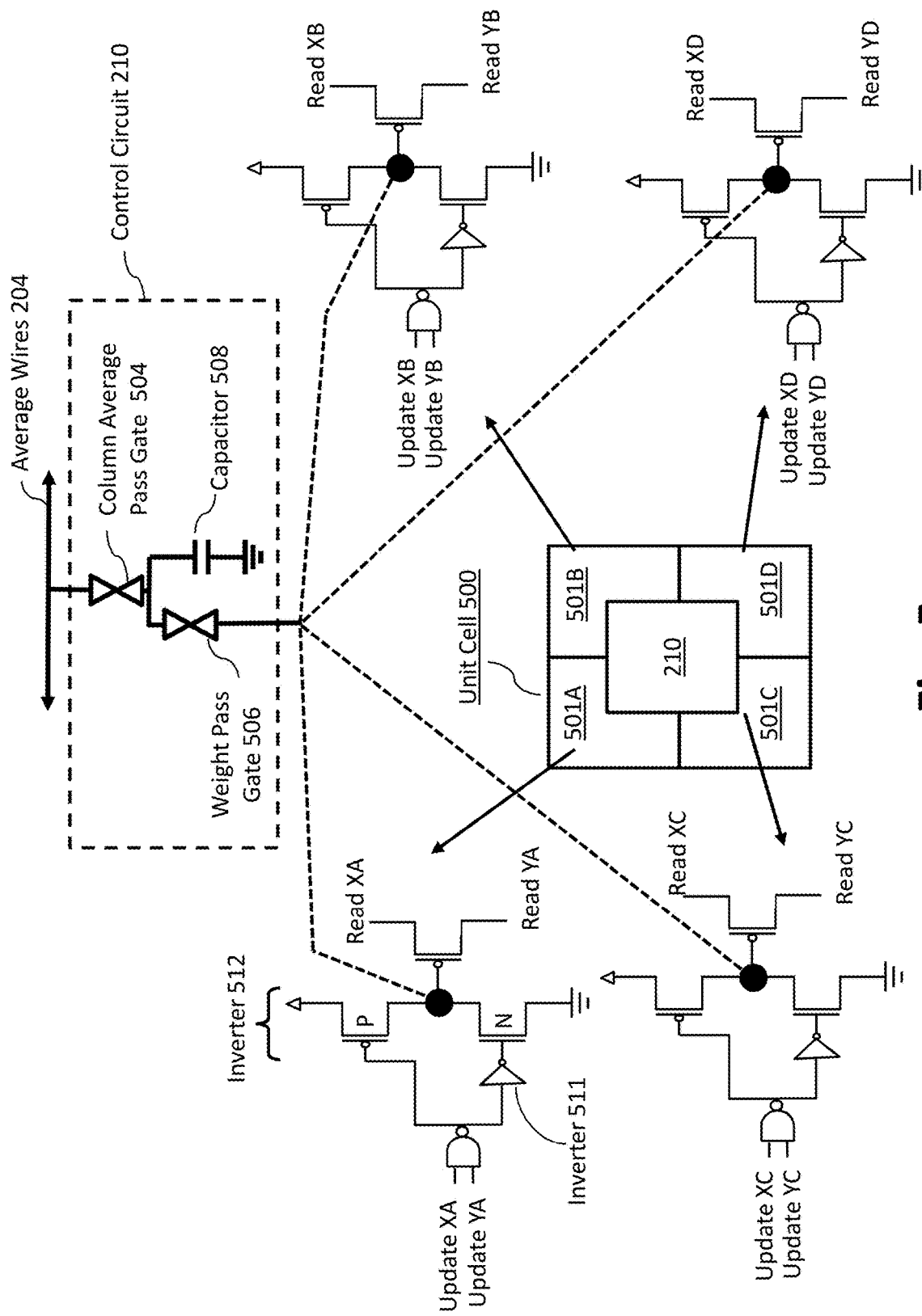
FIG. 5 is a diagram showing additional details of a multi-kernel configuration for convolutional neural networks in one embodiment.

FIG. 5 is a diagram showing additional details of a mixed multiple kernel configuration for convolutional neural networks in one embodiment. FIG. 5 may include components that are labeled identically to components of FIGS. 1-4, which will not be described again for the purposes of clarity. The description of FIG. 5 may reference at least some of the components of FIGS. 1-4.

In an example shown in FIG. 5, a unit cell 500 may include a plurality of operation circuits, such as circuits 501A, 501B, 501C, 501D, and the control circuit 210. In one embodiment, the operation circuits 501A, 501B, 501C, 501D may be substantially same or identical to each other. An operation circuit may include a two-input NAND gate that receives data from a row update wire and a column update wire, an inverter 511 connected to a N-channel of an inverter 512 (to invert the output from the NAND gate prior to the data reaching the N-channel), and a p-type transistor that facilitates application of weights and output of the operation circuit to the row and column read wires.

The control circuit 210 may include a pass gate (also referred to as column average pass gate) 504, a pass gate (also referred to as weight pass gate) 506, and a capacitor (or a storage component) 508. The capacitor 508 may store the weight associated with the element corresponding to the unit cell 500. For example, if unit cell 500 corresponds to an element $K_{11}$ of a kernel K, then the capacitor 508 may be operable to store the weight $w_{11}$ of the element $K_{11}$. A unit cell may include a respective column average pass gate 504. The input of the column average pass gate 504 may be connected to a wire (also referred to as a row average wire) among the average wires 204, where the row average wire may connect the unit cell 500 with unit cells in the same row within the multi-kernel module. For example, the row average wire connected to unit cell 500 may be connected to unit cells corresponding to elements (1, 2), (1, 3), . . . , (1, j), where j is the number of columns in the kernel K. In some examples, the row average wire may be further connected to elements (1, 2), (1, 3), . . . , (1, j) of another multi-kernel module. The output of the column average pass gate 504 may be connected to the input of the weight pass gate 506 and to the capacitor 508. The output of the weight pass gate 506 may be connected to the output of the inverter 512 of an operation circuit in unit cell 500.

An activation of the weight pass gate 506 may cause the weight stored in the capacitor 508 to be passed on to the operation circuits, such that the weight can be applied to the output of the inverter 512, thus implementing a multiplication of a corresponding kernel weight with an input data unit (e.g., a pixel) that may be received at a row read wire (e.g., READ XA wire). The activation of the weight pass gate 506, and a deactivation of the column average pass gate 504 may cause the unit cell 500 to perform three operations: forward operation, backward operation, and update operation. During the forward operation, data may flow from the row read wires to the column read wires (e.g., from ReadXA to ReadYA). During the backward operation, data may flow from the column read wires to the row read wires (e.g., from ReadYA to ReadXA). During the update operation, data associated with updates of the element, such as an update to the weight of the element, corresponding to the unit cell 500 may be sent through the update row and column wires (e.g., UpdateXA and UpdateYA). In an example, the update row and column wires may receive activation signals at the same time to perform weight update to elements in each row and each column in parallel.

A deactivation of the weight pass gate 506, and an activation of the column average pass gate 504 may cause the unit cell 500 to perform an average operation (or a row average operation). During the row average operation, charges at the capacitor 508 may be shared with capacitors of other operation circuits in another multi-kernel module connected to the same row average wire. For example, if unit cell 500 corresponds to element (1, 1) of a kernel, during the row average operation, the capacitor 508 may share a charge with capacitors of a unit cell corresponding to elements (1, 1) in another multi-kernel module. In some examples, the row average operation may be performed for multiple iterations (e.g., P times), until the charges are shared among all capacitors of unit cells in P multi-kernel modules. Sharing the charge among the capacitors may implement an average of weights among the multi-kernel modules.

In an example, the unit cell 500 may be manufactured or constructed by arranging and connecting the components of the unit cell 500 in a particular manner, and embed the arranged and connected components on a chip. In an example, a plurality of operation circuit may be constructed by connecting a p-type transistor to the output of the inverter 512, connecting an output of the inverter 511 to the N-channel of the inverter 512, and connecting an output of a two-input NAND gate to the input of the inverter 511 and to a P-channel of the inverter 512. A number of operation circuits to be constructed may be based on a desired implementation of a CNN. For example, if a kernel with a depth of three (3) is to be used in an implementation of a CNN, three operation circuits may be constructed for each unit cell. In an example, the control circuit may be constructed by connecting a first end of a first pass gate (e.g., column average pass gate) to one or more wires, and a second end of the first pass gate to a first end of a second pass gate (e.g., weight pass gate) and to a capacitor. The unit cell may be constructed by connecting a second end of the second pass gate of the constructed control circuit to the output of inverter 512 of each operation circuit. For example, if a kernel with a depth of three (3) is to be used in an implementation of a CNN, one control circuit and three operation circuits may be constructed for each unit cell, and the one control circuit will be connected to the three operation circuits to form the unit cell.

The number of unit cells to be formed may be based on a size of a kernel of a CNN. For example, if a kernel is a 3×3 kernel, nine unit cells may be formed and grouped into a multi-kernel module. A plurality of wires may be added to the multi-kernel module to connect the unit cells within the multi-kernel module. For example, if a kernel is a 3×3 kernel, a first set of wires may connect operation circuits of three unit cells in a first orientation, resulting in a row of three unit cells. Three rows of three unit cells in each row may be formed, and the operation circuits of three rows of unit cells may be connected by a second set of wires in a second orientation, forming a 3×3 configuration with three rows and three columns of unit cells. To implement the average operation described herein, a plurality of average wires may be added to the multi-kernel modules to connect the control circuits.

Figure 6:
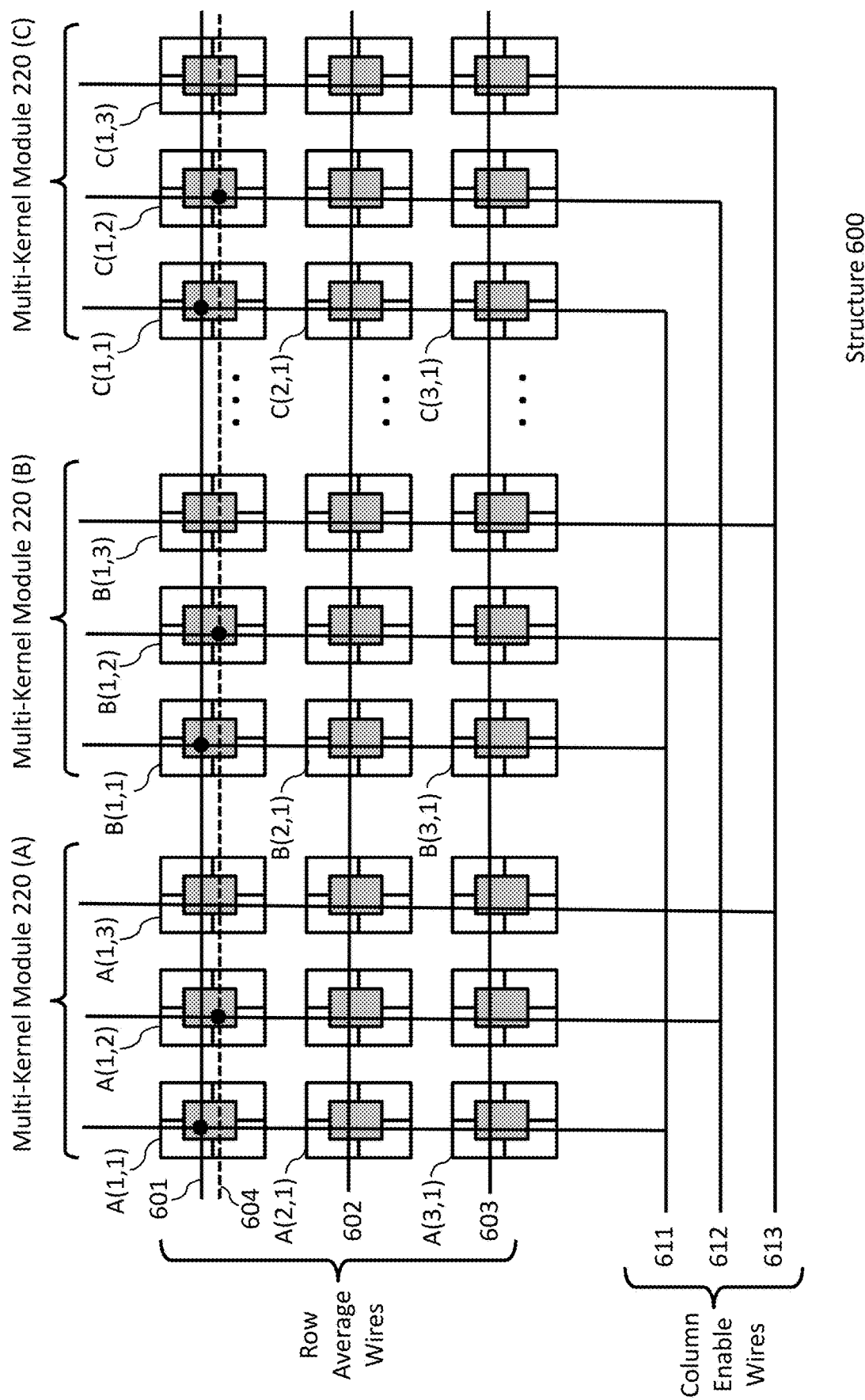
FIG. 6 is a diagram showing additional details of a multi-kernel configuration for convolutional neural networks in one embodiment.

FIG. 6 is a diagram showing additional details of a mixed multiple kernel configuration for convolutional neural networks in one embodiment. FIG. 6 may include components that are labeled identically to components of FIGS. 1-5, which will not be described again for the purposes of clarity. The description of FIG. 6 may reference at least some of the components of FIGS. 1-5.

An example in FIG. 6 shows a first row of multi-kernel modules 220 of a structure 600. The multi-kernel modules 220 may be connected by row average wires 601, 602, 603, and column enable wires 611, 612, 613. The unit cells of one multi-kernel module 220 may be connected to a corresponding unit cell in another multi-kernel module 220 via a row average wire and a column enable wire. In an example embodiment, a row of unit cells among the multi-kernel modules 220 may be connected with each other by a row average wire. For example, a first row of unit cells A(1, 1), A(1, 2), A(1, 3) of the multi-kernel module 220 (A) may be connected to a first row of unit cells B(1, 1), B(1, 2), B(1, 3) of the multi-kernel module 220 (B), and to a first row of unit cells C(1, 1), C(1, 2), C(1, 3) of the multi-kernel module 220 (C) via the row average wire 601. Similarly, the second rows of unit cells in of the multi-kernel modules 220 may be connected with each other via the row average wire 602. The row average wires 601, 602, 603 may be utilized to share charges among unit cells in the same row between multi-kernel modules 220. The column enable wires 611, 612, 613 may transmit respective enable signal to column average pass gates of unit cells in a corresponding column. For example, an enable signal may be transmitted to cells in a first column of the multi-kernel modules 220 connected to column enable wire 611—such as cells A(1, 1), A(2, 1), A(3, 1) of multi-kernel module 220 (A), unit cells B(1, 1), B(2, 1), B(3, 1) of multi-kernel module 220 (B), and unit cells C(1, 1), C(2, 1), C(3, 1) of multi-kernel module 220 (C) may allow charges to flow into respective row average wires. Note that in this embodiment where one row average wire is connecting the same rows of unit cells among the multi-kernel modules 220, the activation of the charge sharing through the column enable wires may need to be performed iteratively for a number of times, which may avoid any errors in the charge sharing capability of the structure 600. For example, if both column enable wire 611 and 612 transmits an enable signal to activate both column 1 and column 2 of the multi-kernel modules simultaneously, the charges of A(1, 1), A(1, 2), B(1, 1), B(1, 2) may be shared. Thus, the columns of unit cells may be activated iteratively, until charges are shared by all unit cells among the multi-kernel modules 220.

In another embodiment, additional row average wires, such as a row average wire 604, may be utilized to reduce the number of activations through the column enable wires 611, 612, 613. In the example show in FIG. 6, when there are additional wires, a row average wire may connect a smaller number of unit cells and may connect unit cells in the same row and also the same column among the multi-kernel modules. For example, the row average wire 601 may connect unit cells A(1, 1), B(1, 1), and C(1, 1), and the row average wire 604 may connect unit cells A(1, 2), B(1, 2), and C(1, 2). Additional row average wires may be added to connect other unit cells, such as another row average wire that connects unit cells A(1, 3), B(1, 3), C(1, 3). Thus, the column enable wires 611, 612, 613 may activate the column average pass gates of the columns of unit cells simultaneously without the need to activate the column average pass gates column by column. For example, column enable wires 611, 612 may be activated simultaneously, and charges may be shared among unit cells A(1, 1), B(1, 1), and C(1, 1) via the row average wire 601, and charges may be shared among unit cells A(1, 2), B(1, 2), and C(1, 2) via the row average wire 604.

Figure 7:
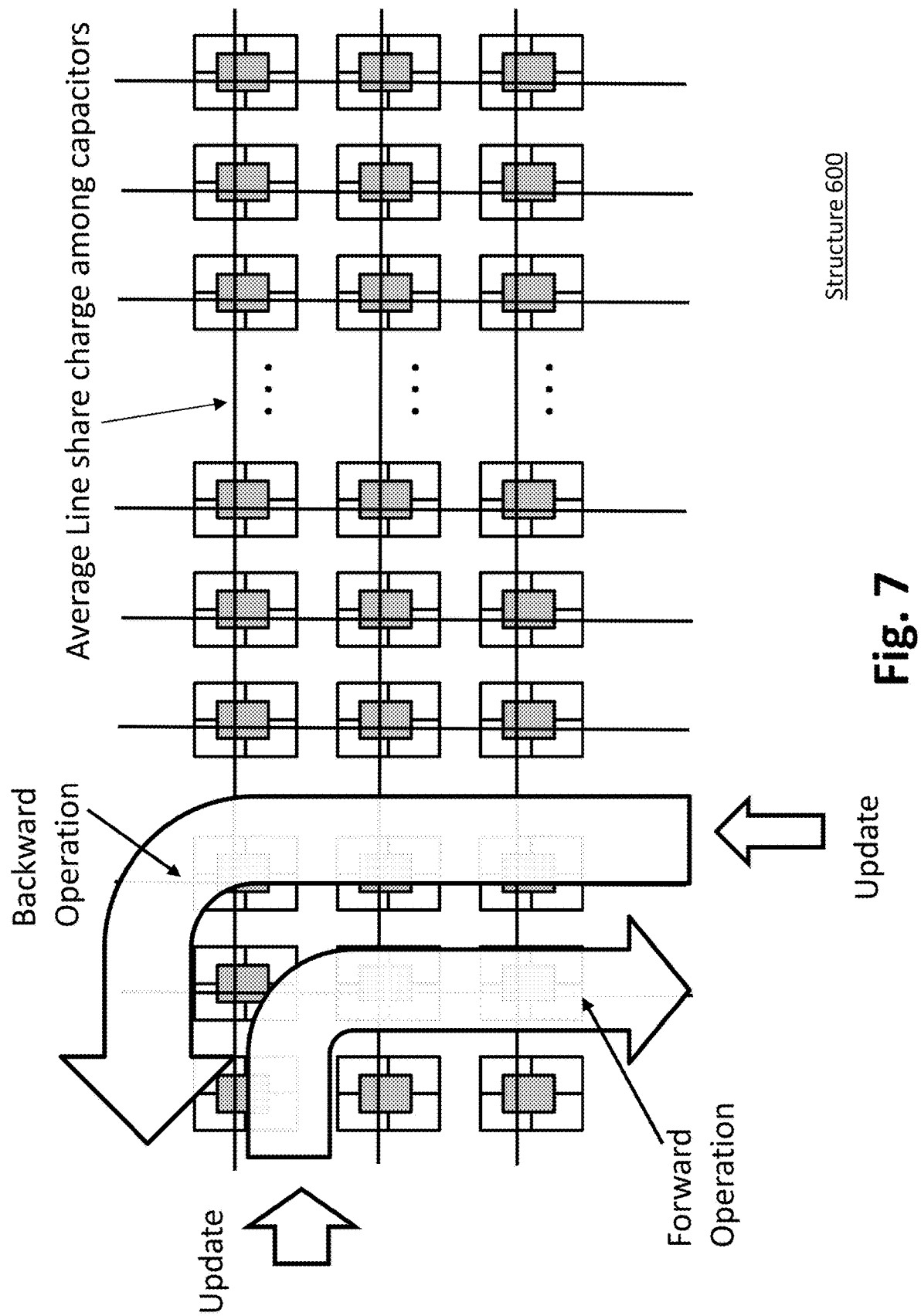
FIG. 7 is a diagram showing an implementation of a multi-kernel configuration for convolutional neural networks in one embodiment.

FIG. 7 is a diagram showing an implementation of a mixed multiple kernel configuration for convolutional neural networks in one embodiment. FIG. 7 may include components that are labeled identically to components of FIGS. 1-6, which will not be described again for the purposes of clarity. The description of FIG. 7 may reference at least some of the components of FIGS. 1-6.

As shown in an example in FIG. 7, the structure 600 may be implemented by a device (e.g., device 200 in FIG. 2) to perform a forward operation, a backward operation, an update operation, and an average operation, associated with an implementation of a convolutional neural network (CNN). During the forward operation, data may flow into the structure 600 from row wires and to be outputted from the column wires, which facilitates a forward pass of data from a previous layer of the CNN to a next layer of the CNN. During the backward operation, data may flow into the structure 600 from column wires and to be outputted from the row wires, which facilitates a backward pass of data from a next layer of the CNN to a previous layer of the CNN. During training of the CNN, the backward operations may facilitate error or back propagation to the unit cells in the multi-kernel module. During the update operation, data may flow into the structure 600 from row update wires and column update wires to perform necessary updates to the structure 600 or to various elements of the CNN. During the average operation, weights stored in portions of unit cells (row or column) of the multi-kernel modules of the structure 600 may be averaged to facilitate averaging of weights in a multiple kernel implementation of a CNN.

Figure 8:
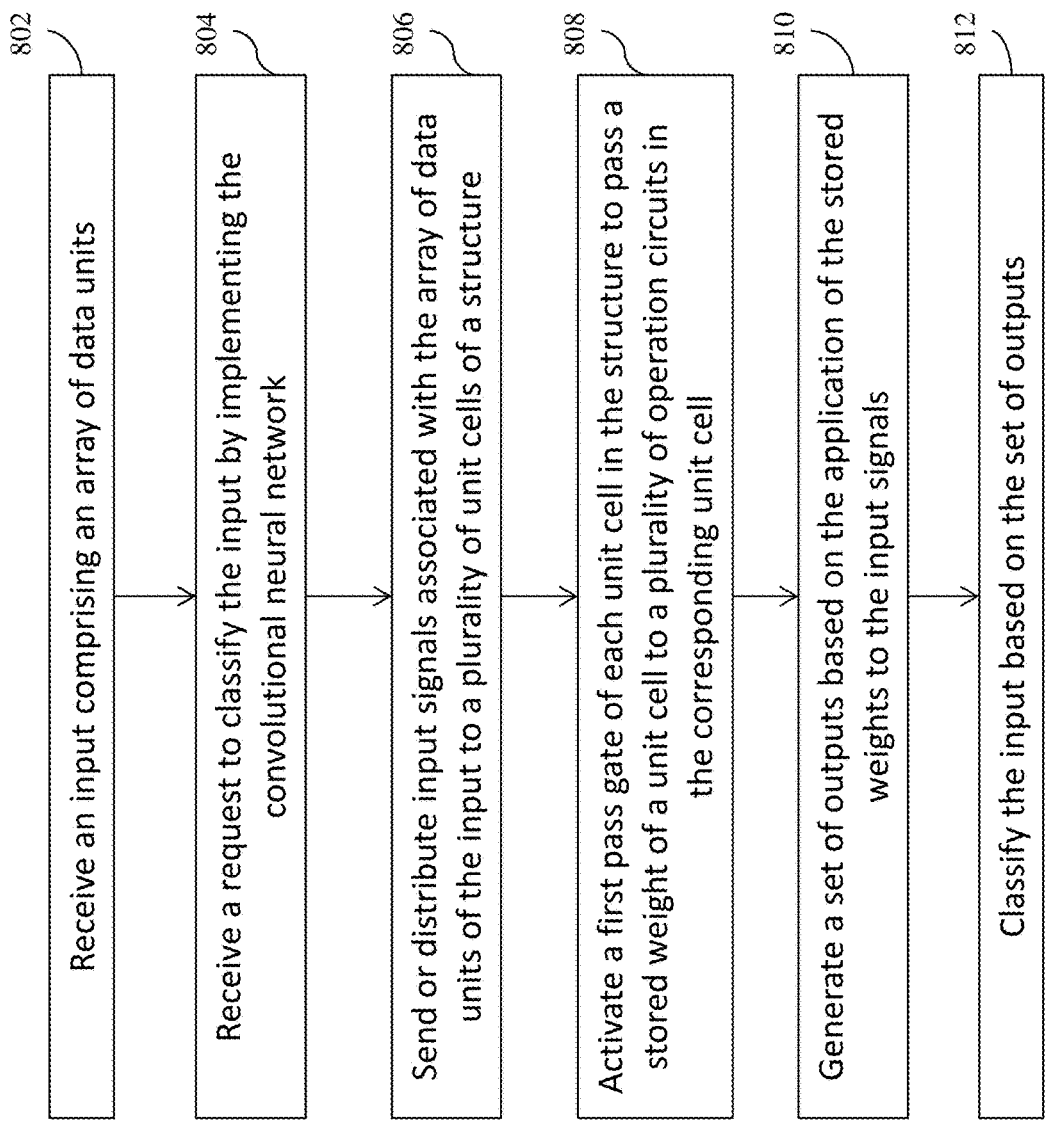
FIG. 8 is a flow diagram illustrating a process that can be performed by a processor to implement a multi-kernel configuration for convolutional neural networks in one embodiment.

FIG. 8 is a flow diagram illustrating a process that can be performed by a processor to implement a mixed multiple kernel configuration for convolutional neural networks in one embodiment. An example process may include one or more operations, actions, or functions as illustrated by one or more of blocks 802, 804, 806, 808, 810, and/or 812. Although illustrated as discrete blocks, various blocks may be divided into additional blocks, combined into fewer blocks, eliminated, or performed in parallel, depending on the desired implementation.

At block 802, a processor of a computer device may receive an input comprising an array of data units. At block 804, the processor may receive a request to classify the input by implementing a convolutional neural network. At block 806, the processor may send or distribute input signals associated with the array of data units of the input to a plurality of unit cells of a structure. The structure may include a plurality of multi-kernel modules. A multi-kernel module may include a respective set of unit cells. A unit cell may correspond to an element of a kernel being implemented in the convolutional neural network. The unit cell may further include a storage component configured to store a weight of a corresponding element of the kernel. At block 808, the processor may activate a first pass gate of the unit cell in the structure to pass a stored weight of the unit cell to a plurality of operation circuits in the corresponding unit cell. The passing of the stored weight to the plurality of operation circuits may cause the unit cell to apply the stored weight to input signals received at the plurality of operation circuits. At block 810, the processor may generate a set of outputs based on the application of the stored weights to the input signals. At block 812, the processor may classify the input based on the set of outputs.

Figure 9:
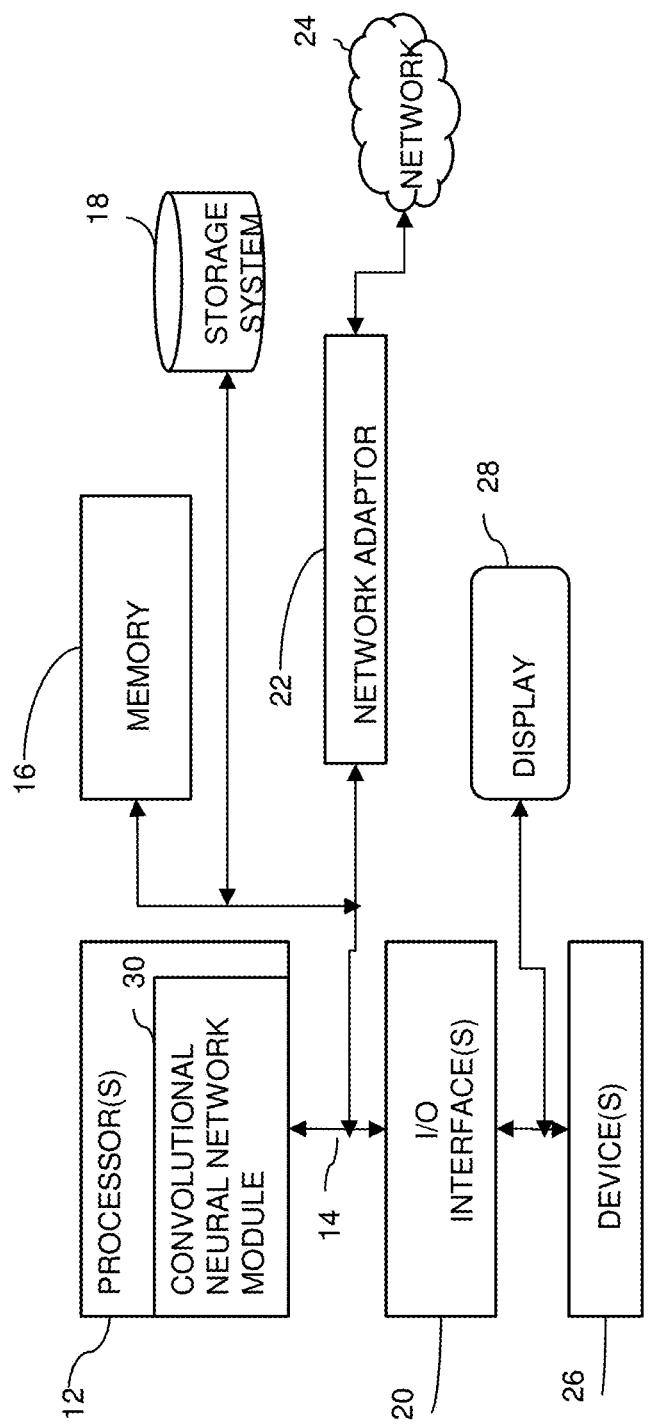
FIG. 9 illustrates a schematic of an example computer or processing system that may implement multi-kernel configuration for convolutional neural networks, in one embodiment of the present disclosure.

FIG. 9 illustrates a schematic of an example computer or processing system that may implement multi-kernel configuration for convolutional neural networks, in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 9 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, supercomputers, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 (e.g., convolutional neural network module 30) that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A structure comprising:
    a plurality of multi-kernel modules, wherein a multi-kernel module comprises a plurality of unit cells, a unit cell corresponding to an element of a kernel being implemented in a convolutional neural network, wherein the unit cell comprises:
    a control circuit comprising a storage component configured to store a weight of a corresponding element of the kernel;
    a plurality of operation circuits connected to the control circuit, an operation circuit of the plurality of operation circuits being operable to receive an input signal associated with a data unit among an array of data units;
    wherein the control circuit is operable to control an application of the weight to the input signals received by the plurality of operation circuits to implement the convolutional neural network for outputting a classification of the array of data units.

2. The structure of claim 1, wherein the plurality of multi-kernel modules are identical to each other.

3. The structure of claim 1, wherein the plurality of operation circuits are identical to each other.

4. The structure of claim 1, wherein the storage component is a capacitor.

5. The structure of claim 1, wherein the control circuit further comprises:
    a first pass gate operable to control a charge being applied to the storage component; and
    a second pass gate operable to control a transmission of the weight to the plurality of operation circuits.

6. The structure of claim 5, wherein an activation of the second pass gate causes the plurality of unit cells to perform:
    a forward operation that comprises transmission of data from a plurality of wires in a first orientation to a plurality of wires in a second orientation in each operation circuit;
    a backward operation that comprises transmission of data from the plurality of wires in the second orientation to the plurality of wires in the first orientation in each operation circuit; and
    an update operation that comprises an update of the elements of the kernel corresponding to the unit cells.

7. The structure of claim 5, wherein a portion of unit cells corresponding to a group of elements of the kernel are connected by a wire, the wire is connected to the first pass gates of the portion of unit cells, and an activation of the first pass gates of the portion of the unit cells causes the charge to be shared among storage components of the portion of unit cells.

8. The structure of claim 7, wherein the portion of unit cells is a first portion of unit cells corresponding to a first group of elements of the kernel and the wire is a first wire,
    wherein the structure further comprises a second portion of unit cells corresponding to a second group of elements of the kernel connected by a second wire, the second wire being connected to the first pass gates of the second portion of unit cells, and
    wherein an activation of the first pass gates of the second portion of the unit cells causes the charge to be shared among storage components of the second portion of unit cells.

9. The structure of claim 1, wherein each operation circuit comprises:
- a NAND gate operable to receive update data;
    - a first inverter, wherein an output of the first inverter is connected to an output of the control circuit;
    - a second inverter, wherein an input of the second inverter is connected to an output of the NAND gate, and an output of the second inverter is connected to a N-channel of the first inverter; and
    - a p-type transistor connected to the output of the first inverter.

10. A system comprising:
a processor;
a structure configured to be in communication with the processor, the structure comprises:
- a plurality of multi-kernel modules, wherein a multi-kernel module comprises a plurality of unit cells, a unit cell corresponds to an element of a kernel being implemented in a convolutional neural network, and wherein the unit cell comprises:
    - a control circuit comprising a storage component configured to store a weight of a corresponding element of the kernel;
    - a plurality of operation circuits connected to the control circuit, an operation circuit of the plurality of operation circuits being operable to receive an input signal associated with a data unit among an array of data units;
    - wherein the control circuit is operable to control an application of the stored weight to the input signals received by the plurality of operation circuits to implement the convolutional neural network;

the processor being configured to:
- receive an input comprising the array of data units;
- receive a request to classify the input by implementing the convolutional neural network;
- send the input to the structure to perform the classification of the input.

11. The system of claim 10, wherein the plurality of multi-kernel modules are identical to each other.

12. The system of claim 10, wherein the plurality of operation circuits are identical to each other.

13. The system of claim 10, wherein the storage component is a capacitor.

14. The system of claim 10, wherein the control circuit further comprises:
- a first pass gate operable to control a charge being applied to the storage component; and
- a second pass gate operable to control a transmission of the weight to the plurality of operation circuits.

15. The system of claim 14, wherein an activation of the second pass gate causes the plurality of unit cells to perform:
- a forward operation that comprises transmission of data from a plurality of wires in a first orientation to a plurality of wires in a second orientation in each operation circuit;
- a backward operation that comprises transmission of data from the plurality of wires in the second orientation to the plurality of wires in the first orientation in each operation circuit; and
- an update operation that comprises an update of the elements of the kernel corresponding to the unit cells.

16. The system of claim 14, wherein a portion of unit cells corresponding to a group of elements of the kernel are connected by a wire, the wire is connected to the first pass gates of the portion of unit cells, and an activation of the first pass gates among the portion of the unit cells causes the charge to be shared among storage components of the portion of unit cells.

17. The system of claim 10, wherein each operation circuit comprises:
- a NAND gate operable to receive update data;
    - a first inverter, wherein an output of the first inverter is connected to an output of the control circuit;
    - a second inverter, wherein an input of the second inverter is connected to an output of the NAND gate, and an output of the second inverter is connected to a N-channel of the first inverter; and
    - a p-type transistor connected to the output of the first inverter.

18. A computer-implemented method comprising:
- receiving an input comprising an array of data units;
- receiving a request to classify the input by implementing a convolutional neural network;
- sending input signals associated with the array of data units of the input to a plurality of unit cells of a structure, wherein the structure comprises a plurality of multi-kernel modules, a multi-kernel module comprises a respective set of unit cells, a unit cell corresponds to an element of a kernel being implemented in the convolutional neural network, and wherein the unit cell comprises a storage component configured to store a weight of a corresponding element of the kernel;
- activating a first pass gate of each unit cell in the structure to pass a stored weight of each unit cell to a plurality of operation circuits in the corresponding unit cell, wherein passing the stored weight to the plurality of operation circuits causes the unit cells to apply the stored weight to input signals received at the plurality of operation circuits;
- generating a set of outputs based on the application of the stored weights to the input signals; and
- classifying the input based on the set of outputs.

19. The computer-implemented method of claim 18, wherein activating the first pass gate causes the structure to perform:
- a forward operation that comprises transmission of data from a plurality of wires in a first orientation to a plurality of wires in a second orientation in each operation circuit;
- a backward operation that comprises transmission of data from the plurality of wires in the second orientation to the plurality of wires in the first orientation in each operation circuit; and
- an update operation that comprises an update of the elements of the kernel corresponding to the unit cells.

20. The computer-implemented method of claim 18, further comprising activating a second pass gate of the structure to cause the structure to perform an average operation, wherein the average operation comprises sharing a charge among storage components of the portion of unit cells to average the weights stored among the storage components of the portion of unit cells.

* * * * *